US009050825B2

(12) United States Patent
Morgan et al.

(10) Patent No.: US 9,050,825 B2
(45) Date of Patent: Jun. 9, 2015

(54) SYSTEM AND METHOD FOR CAPTURING AND TRANSLATING BRAILLE EMBOSSING

(75) Inventors: David Morgan, Watertown, MA (US);
David A. Carhart, Cary, IL (US);
Michael C. Garrett, Wilmette, IL (US);
Stephen Lingle, McHenry, IL (US);
Frank Pistorio, Itasca, IL (US);
Jackson Wilson, Evanston, IL (US)

(73) Assignee: Perkins School for the Blind, Watertown, MA (US)

( * ) Notice: Subject to any disclaimer, the term of this patent is extended or adjusted under 35 U.S.C. 154(b) by 313 days.

(21) Appl. No.: 13/102,608

(22) Filed: May 6, 2011

(65) Prior Publication Data
US 2012/0009549 A1 Jan. 12, 2012

Related U.S. Application Data

(60) Provisional application No. 61/332,310, filed on May 7, 2010.

(51) Int. Cl.
*B41J 3/32* (2006.01)
*G09B 21/02* (2006.01)
*G09B 21/00* (2006.01)

(52) U.S. Cl.
CPC . *B41J 3/32* (2013.01); *G09B 21/003* (2013.01)

(58) Field of Classification Search
CPC .............................. B41J 3/32; G09B 21/003
USPC ......... 434/113; 101/4; 400/109, 109.1, 91–94
See application file for complete search history.

(56) References Cited

U.S. PATENT DOCUMENTS

| | | | |
|---|---|---|---|
| 2,454,637 A | 11/1948 | Tejedo | |
| 3,032,164 A | 5/1962 | Watari | |
| 3,254,750 A * | 6/1966 | Goldner | 400/109.1 |
| 3,597,538 A * | 8/1971 | Binenbaum | 178/17.5 |
| 4,194,190 A * | 3/1980 | Bareau | 340/407.2 |
| 4,439,647 A * | 3/1984 | Calandrello et al. | 200/5 A |
| 5,536,170 A | 7/1996 | Murphy | |
| 5,574,447 A * | 11/1996 | Roylance | 341/22 |
| 6,542,623 B1 | 4/2003 | Kahn | |
| 6,827,512 B1 | 12/2004 | Souluer | |
| 7,107,219 B2 * | 9/2006 | Nemoto | 704/271 |
| 2005/0140544 A1 | 6/2005 | Hamel et al. | |
| 2006/0228146 A1 | 10/2006 | Takayama et al. | |
| 2007/0277020 A1 * | 11/2007 | Kelley | 712/38 |
| 2008/0153072 A1 * | 6/2008 | Kurashina | 434/114 |
| 2008/0238725 A1 * | 10/2008 | Gitzinger et al. | 341/22 |
| 2008/0316065 A1 * | 12/2008 | Maber | 341/23 |

(Continued)

OTHER PUBLICATIONS

British Further Examination Report on 1018299.6 dated Dec. 2, 2011.

(Continued)

*Primary Examiner* — Daniel J Colilla
*Assistant Examiner* — John M Royston
(74) *Attorney, Agent, or Firm* — Foley and Larnder LLP; John D. Lanza

(57) ABSTRACT

The present disclosure describes, among other things, a device. The device includes a plurality of sensors, an output system, a processor coupled to the plurality of sensors and the output system, and a memory. The memory stores instructions that, when executed by the processor, cause the processor to receive a signal from the plurality of sensors, interpret the signal as a first Braille cell, and send a signal corresponding to the first Braille cell to the output system.

10 Claims, 11 Drawing Sheets

(56) References Cited

U.S. PATENT DOCUMENTS

2009/0056566 A1    3/2009   Tanaka et al.
2009/0274505 A1*  11/2009   Morgan et al. ............. 400/109.1
2010/0047002 A1    2/2010   Schleppenbach et al.

OTHER PUBLICATIONS

First Examination Report for GB 1018299.6 mailed Nov. 18, 2010.
International Preliminary Report on Patentability on PCT/US2008/080172 dated Nov. 9, 2010.
International Search Report on PCT/US2011/035645 dated Feb. 17, 2012.
Office Action on U.S. Appl. No. 12/115,044 dated Aug. 5, 2011.
Second Examination Report for GB 1018299.6 mailed Jul. 5, 2011.
Written Opinion, Dec. 19, 2008, PCT/US2008/080172.
International Preliminary Report on Patentability dated Nov. 13, 2012 for PCT/US2011/035645.

* cited by examiner

SYSTEM AND METHOD FOR CAPTURING AND TRANSLATING BRAILLE EMBOSSING

RELATED APPLICATION

The present application claims priority to U.S. Application No. 61/332,310, "System and Method for Capturing and Translating Braille Embossing," filed May 7, 2010, the contents of which are incorporated by reference in their entirety.

FIELD

The present disclosure relates to methods and systems for writing and embossing with Braille. In particular, the present disclosure relates to methods and systems for capturing embossing motions of a mechanical Braille writer and translating the motions into data for output.

BACKGROUND

Braille was invented more than 175 years ago to provide a system that blind people can use to read and write. Braille is a system of raised dots that can be read very quickly with the fingers. Braille writers exist in either mechanical or electronic formats.

SUMMARY

In some aspects, the present disclosure is directed to a device. The device can include a plurality of sensors, an output system, a processor coupled to the plurality of sensors and the output system, and a memory. The memory can store instructions that, when executed by the processor, cause the processor to receive a signal from the plurality of sensors, interpret the signal as a first Braille cell, and send a signal corresponding to the first Braille cell to the output system.

The memory can store instructions that, when executed by the processor, further cause the processor to interpret the signal as a letter, number, symbol, or punctuation mark. The memory can store instructions that, when executed by the processor, further cause the processor to determine that the first Braille cell has been entered. The memory can store instructions that, when executed by the processor, further cause the processor to determine that keys for the first Braille cell have been depressed or reset. The memory can store instructions that, when executed by the processor, further cause the processor to determine that an embosser head has been advanced or a space key has been depressed. The memory can store instructions that, when executed by the processor, further cause the processor to determine that a predetermined period of time has elapsed since a key of a Braille writer has been depressed or reset. The predetermined period of time can be 10 ms, 20 ms, 50 ms, 100 ms, or 500 ms.

The plurality of sensors can comprise at least one of Hall-effect sensors and optical sensors. The plurality of sensors can transmit the signal to the processor in response to detection of a magnetic field exceeding a threshold. The plurality of sensors can transmit the signal to the processor in response to detection of an optical signal falling below a threshold.

The memory can store instructions that, when executed by the processor, further cause the processor to send the signal corresponding to the first Braille cell to memory for storage. The memory can store instructions that, when executed by the processor, further cause the processor to produce an audio signal corresponding to the first Braille cell, and send the audio signal to the output system.

The output system can comprise at least one of a visual display and an audio system. The output system can comprise at least one of an LCD screen, speaker, printer, cathode ray tube monitor, storage device, and teletypewriter. The device can be configured to be coupled to a mechanical Braille writer.

In some aspects, the present disclosure is directed to a method. The method can include receiving, by a processor, a signal from a plurality of sensors; interpreting, by the processing, the signal as a first Braille cell; and sending, by the processor, a signal corresponding to the first Braille cell to an output system. Interpreting the signal as the first Braille cell can include interpreting the signal as the first Braille cell after a timer set upon activation of a first key of a Brailler writer elapses. Interpreting the signal as the first Braille cell can include resetting the timer upon activation of a second key of the Brailler writer.

BRIEF DESCRIPTION OF THE DRAWING

The foregoing and other objects, aspects, features, and advantages of the present disclosure will become more apparent and better understood by referring to the following description taken in conjunction with the accompanying drawing, in which.

Figure 1A:
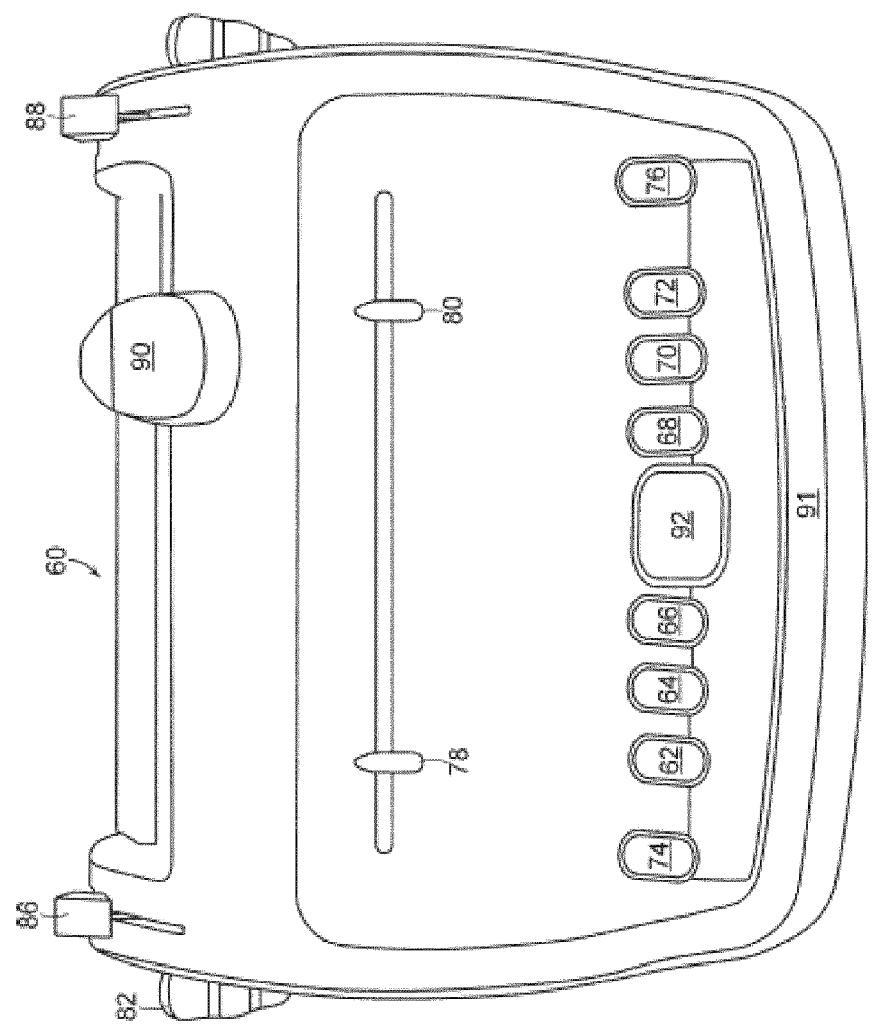
FIG. 1A is a block diagram of a perspective view of an implementation of a mechanical Braille writer.

The features and advantages of the present disclosure will become more apparent from the detailed description set forth below when taken in conjunction with the drawing, in which like reference characters identify corresponding elements throughout. In the drawing, like reference numbers generally indicate identical, functionally similar, and/or structurally similar elements.

DETAILED DESCRIPTION OF CERTAIN IMPLEMENTATIONS

For purposes of reading the description of the various implementations below, the following descriptions of the sections of the specification and their respective contents can be helpful:

Section A describes implementations of mechanical Braille writers;

Section B describes implementations of a computing device which can be useful for practicing implementations described herein; and Section C describes implementations of systems and methods for capturing and translating Braille embossing.

A. Mechanical Braille Writer

Referring now to FIGS. 1A-1F, implementations of a mechanical Braille writer 60 are shown and described. As shown in FIG. 1A, a mechanical Braille writer 60 can include embossing keys 62-72, a line spacing key 74, and a back space key 76. The mechanical Braille writer 60 can include margin guides 78 and 80 at the front of the Braille writer 60. The Braille writer 60 can include paper advance knobs 82 and 84, which can include a "wingnut" configuration for ease of gripping. The Braille writer 60 can include paper release levers 86 and 88. Braille writer 60 can include an embossing mechanism or carriage assembly 90. A front portion 91 of the Braille writer 60 can serve as an integrated handle.

Figure 1B:
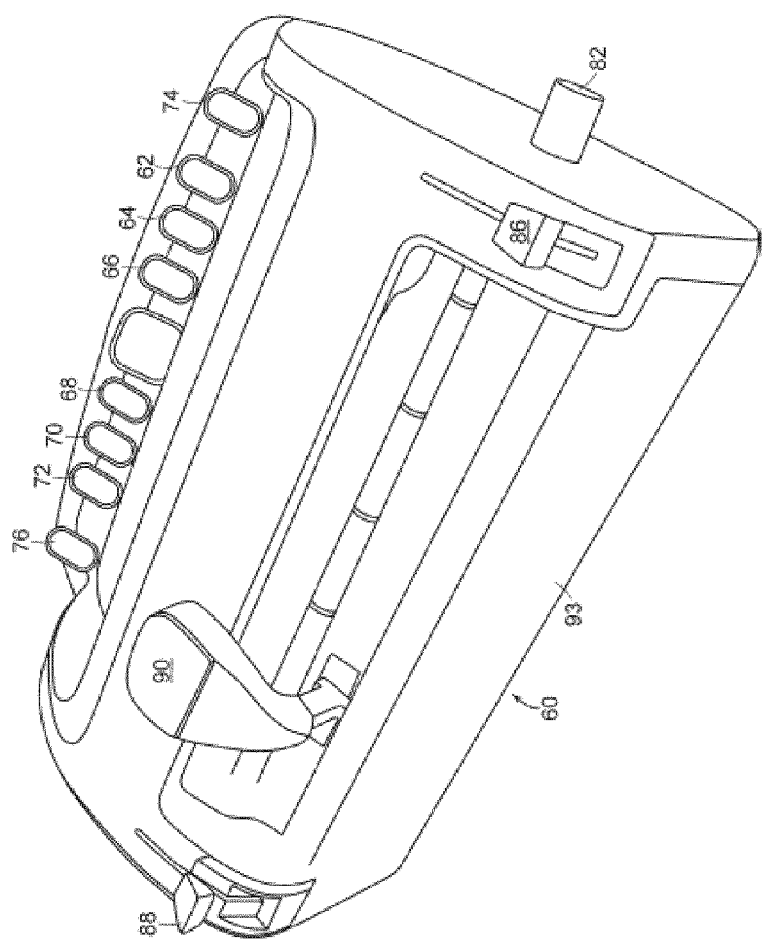
FIG. 1B is a block diagram of a perspective, rear view of an implementation of a mechanical Braille writer.

Referring now to FIG. 1B, a Braille writer 60 can include a moveable panel 93, which can serve as an integrated paper tray, reading rest and alignment surface. Referring ahead to FIG. 1E, a Braille writer 60 can include a paper drum assembly.

Figure 1C:
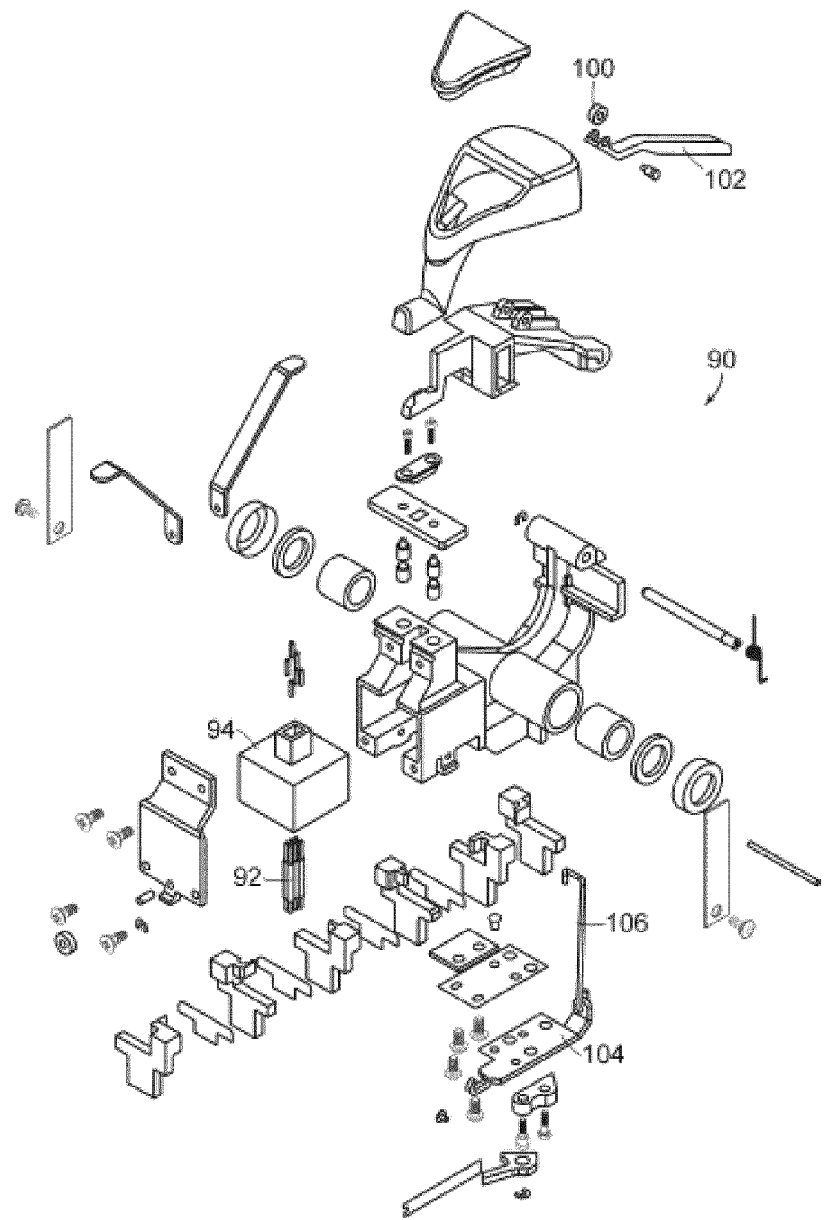
FIG. 1C is a block diagram of an exploded, perspective view of an implementation of a mechanical embossing mechanism.

Referring now to FIG. 1C, an implementation of an embossing mechanism or carriage assembly 90 for use in a mechanical Braille writer 60 is shown and described. The mechanism 90 can include an array of six pins 92 that are slidingly guided by structure 94. The pins in the array of pins 92 can be straight and identical, allowing for ease of assembly and adjustment.

Still referring to FIG. 1C, also shown is a carriage head release mechanism. A button 100 can be pushed downwardly onto a beam 102. The beam 102 can lift a cell spacer assembly 104 by means of a hooked wire 106. Pushing the button 100 can result in the lifting of the cell spacer assembly 104 away from the rack bar, thereby releasing the carriage.

In operation, a user can depress (also referred to herein as "press") one of the embossing keys 62-72, causing a corresponding one of the pins in the array 92 to extend so as to emboss a raised dot on paper (not shown) passing between surfaces of the embossing mechanism 90. After a letter is created, the user can activate a spacebar 92 to advance the paper, thereby preparing for embossing a next letter. The spacebar 92 can be mechanically linked to embossing keys 62-72 such that upon release of all depressed embossing keys 62-72, the embossing mechanism 90 can be moved to the next Braille cell.

Figure 1D:
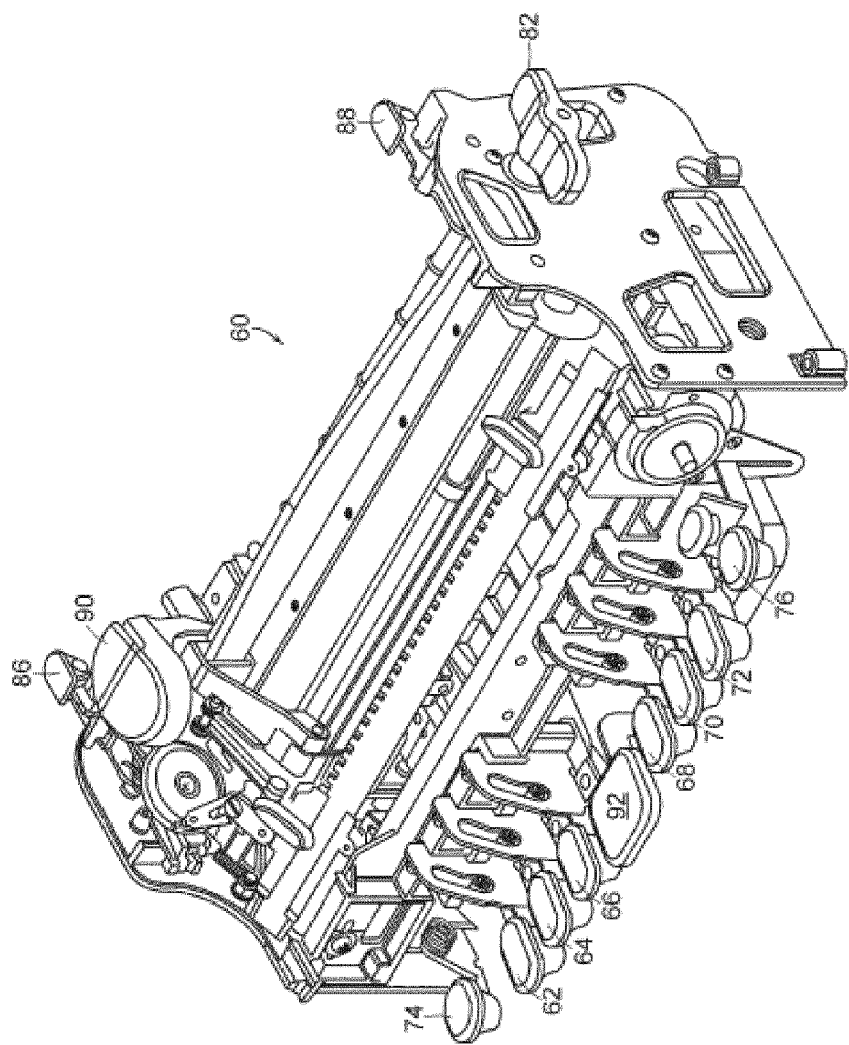
FIG. 1D is a block diagram of a perspective view, with cover removed, of an implementation of a mechanical Braille writer.
Figure 1E:
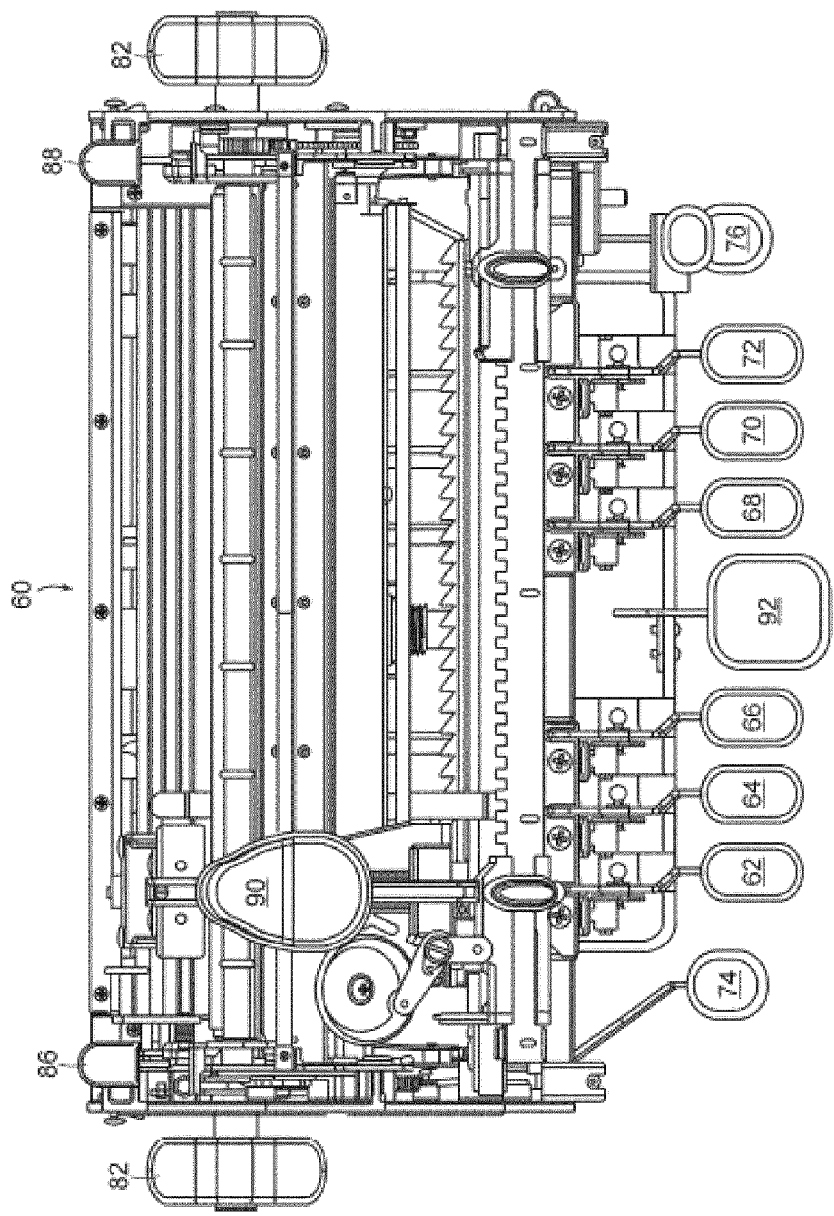
FIG. 1E is a block diagram of a plan view, with cover removed, of an implementation of a mechanical Braille writer.
Figure 1F:
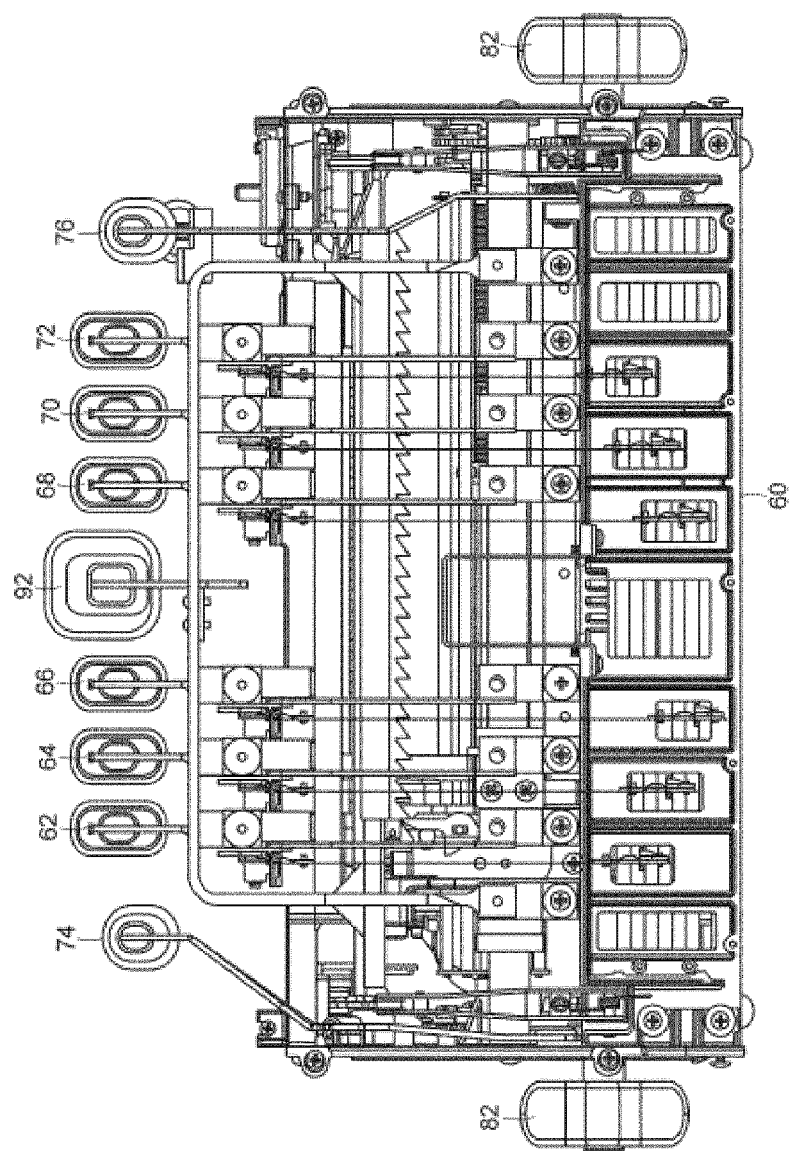
FIG. 1F is a block diagram of a bottom view of an implementation of a mechanical Braille writer.

FIGS. 1D, 1E and 1F illustrate cutaway views of implementations of a mechanical Braille writer, showing the mechanical interconnections that enable embossing. Referring back to FIG. 1C, each pin 92 can lifted by a corresponding lifter segment arranged from the front of the Braille writer to the back and shown below pins 92. Referring now to FIG. 1F, which shows a cutaway view from below Braille writer 60, embossing keys 62-72 can be connected via levers to a plurality of bars running horizontally across the Braille writer 60 (although shown running from top to bottom in the rotated view of FIG. 1F). Each of the plurality of bars can correspond to the plurality of lifter segments shown in FIG. 1C, such that lifting the bar can raise the lifter segment of the embosser head and the corresponding pin, regardless of the position of the embosser head.

B. Computing Device

Figure 2:
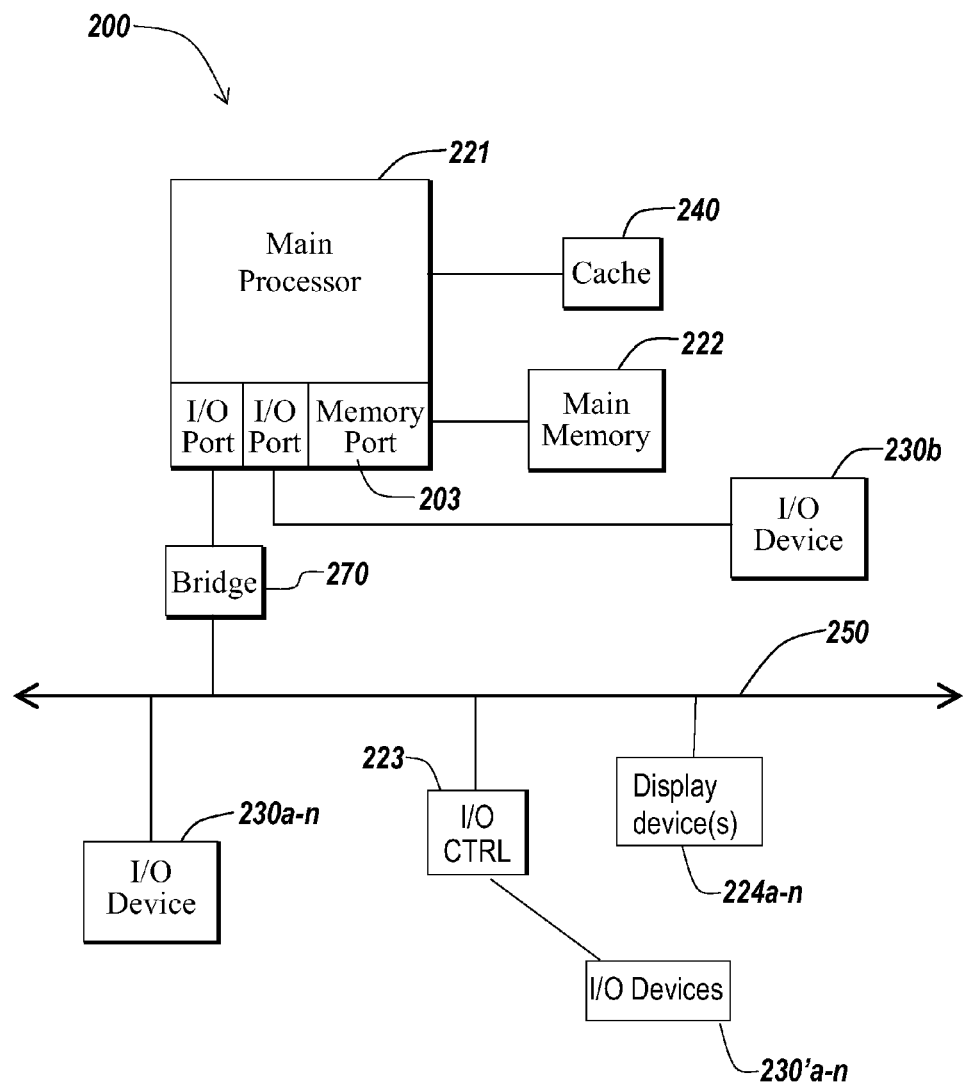
FIG. 2 is a block diagram depicting an implementation of a computing device useful in connection with the methods and systems described herein.

In some implementations, a device that can be coupled to a Braille writer 60 (described in more detail in Section C) can include a computing device. FIG. 2 depicts a block diagram of an exemplary computing device 200 useful for practicing an implementation of such a device. As shown in FIG. 2, a computing device 200 can include a central processing unit or main processor 221, and a main memory unit 222. In some implementations, a computing device 200 can include one or more I/O ports, connected to one or more I/O devices 230a-n. In some implementations, such connection can be direct, such as the illustrated connection to I/O device 230b, while in other implementations, such connection can be indirect via a bridge 270 and/or a bus 250, such as the illustrated connection to I/O devices 230a-n. In one implementation, a computing device can include a memory port 203, while in other implementations, main memory 222 can be directly available to main processor 221. In many implementations, a computing device 200 can include a cache 240.

A central processing unit or main processor 221 can comprise any logic circuitry that responds to and processes instructions fetched from a main memory unit 222. In some implementations, the processor can be have ARM architecture (e.g., ARM9).

In many implementations, the processor 221 can be provided by a microprocessor unit, such as: those manufactured by STMicroelectronics N.V. of Geneva, Switzerland, including the ARM-based STM32 family of micorprocessors; those manufactured by Intel Corporation of Mountain View, Calif.; those manufactured by Motorola Corporation of Schaumburg, Ill.; those manufactured by Freescale Semiconductor, Inc. of Austin, Tex.; those manufactured by Transmeta Corporation of Santa Clara, Calif.; the RS/6000 processor or others manufactured by International Business Machines of White Plains, N.Y.; those manufactured by Marvell Semiconductor, Inc. of Santa Clara, Calif.; or those manufactured by Advanced Micro Devices of Sunnyvale, Calif. The computing device 200 can be based on any of these processors, or any other processor capable of operating as described herein. In some implementations, the computing device 200 can include more than one processor.

Main memory unit 222 can be one or more memory chips capable of storing data and allowing any storage location to be directly accessed by the microprocessor 221, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 222 can be based on any of the above described memory chips, or any other available memory chips capable of operating as described herein. In some implementations, main memory unit 222 can include a non-volatile memory element, such as read-only memory (ROM), programmable ROM (PROM), erasable PROM (EPROM), electrically erasable PROM (EEPROM), flash memory, magnetoresistive RAM (MRAM), ferroelectric RAM (FRAM), or any other type and form of non-volatile memory. In some implementations, a main memory unit 222 can be located internally in the Braille writer 60. In some implementations, the main memory unit 222 can be located within an LCD screen module 400 discussed in more detail below, or in an add-on module.

In some implementations, microprocessor 221 can communicate with main memory 222 via a serial interface. In some implementations, microprocessor 221 can communicate with main memory 222 via a parallel interface. In some implementations, the processor 221 can communicate with main memory 222 via a system bus 250 (described in more detail below).

FIG. 2 depicts an implementation of a computing device 200 in which the processor can communicate directly with main memory 222 via a memory port 203. For example, in FIG. 2 the main memory 222 can be DRDRAM. The main processor 221 can communicate directly with cache memory 240 via a secondary bus, sometimes referred to as a backside bus. In some implementations, the main processor 221 can communicate with cache memory 240 using the system bus 250. Cache memory 240 can have a faster response time than main memory 222. Cache memory 240 can be provided by SRAM, BSRAM, or EDRAM.

In some implementations, the processor 221 can communicates with various I/O devices 230 via a local system bus 250. Various buses can be used to connect the central processing unit 221 to any of the I/O devices 230, including a VESA VL bus, an ISA bus, an EISA bus, a MicroChannel Architecture (MCA) bus, a PCI bus, a PCI-X bus, a PCI-Express bus, or a NuBus. For implementations in which the I/O device is a video display 224, the processor 221 can use an Advanced Graphics Port (AGP) to communicate with the display 224. In some implementations, the processor 221 can communicate directly with I/O device 230b via HYPERTRANSPORT, RAPIDIO, or INFINIBAND communications technology.

FIG. 2 also depicts an implementation in which local buses and direct communication can be mixed: the processor 221 can communicate with an I/O device 230a using a local interconnect bus while communicating with another I/O device 230b directly. I/O devices 230a-n or 230'a-n can comprise a wide variety of I/O devices, with input devices including sensors, switches, keyboards, and microphones. Output devices can include video displays, speakers, inkjet printers (e.g., with liquid ingress protection), laser printers, and dye-sublimation printers. An I/O controller 223, as shown in FIG. 2, can control the I/O devices. The I/O controller can control one or more I/O devices 230'a-n. An I/O device can provide storage and/or an installation medium for the computing device 200. The computing device 200 can provide one or more USB connections (not shown). USB connections can be utilized to interface with various USB-communications capable devices, including handheld USB storage devices such as the USB Flash Drive line of devices manufactured by Twintech Industry, Inc. of Los Alamitos, Calif.; USB printers, including inkjet, laser, dot-matrix, thermal printers, or other types of printing devices, or non-USB printers via a USB-serial or USB-parallel adapter; USB displays, including Liquid Crystal Display (LCD), Light Emitting Diode (LED), Organic LED (OLED), or electronic ink (eInk) based displays; USB-based wireless network adapters; or any other type and form of USB-based device, accessory, or adapter.

Still referring to FIG. 2, the computing device 200 can support any suitable installation device, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing or updating software and programs. The computing device 200 can include a storage device, such as one or more hard disk drives or flash storage mediums, for storing an operating system and other related software, and for storing application software programs.

In some implementations, the computing device 200 can include a network interface to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above, such as, for example, to connect to a networked printer or device. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). A network interface can comprise a built-in network adapter, network interface card, PCMCIA network card, card bus network adapter, wireless network adapter, USB network adapter, modem or any other device suitable for interfacing the computing device 200 to any type of network capable of communication and performing the operations described herein.

In some implementations, the computing device 200 can comprise or be connected to multiple display devices 224a-224n, which each can be of the same or different type and/or form. As such, any of the I/O devices 230a-230n and/or the I/O controller 223 can comprise any type and/or form of suitable hardware, software, or combination of hardware and software to support, enable or provide for the connection and use of multiple display devices 224a-224n by the computing device 200. For example, the computing device 200 can include any type and/or form of video adapter, video card, driver, and/or library to interface, communicate, connect or otherwise use the display devices 224a-224n. In some implementations, a video adapter can comprise multiple connectors to interface to multiple display devices 224a-224n. The computing device 200 can include multiple video adapters, with each video adapter connected to one or more of the display devices 224a-224n. Any portion of the operating system of the computing device 200 can be configured for using multiple displays 224a-224n. One ordinarily skilled in the art will recognize and appreciate the various ways and implementations that a computing device 200 can be configured to have multiple display devices 224a-224n.

An I/O device 230 can be a bridge between the system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

C. Capturing and Translating Braille Embossing

Figure 3A:
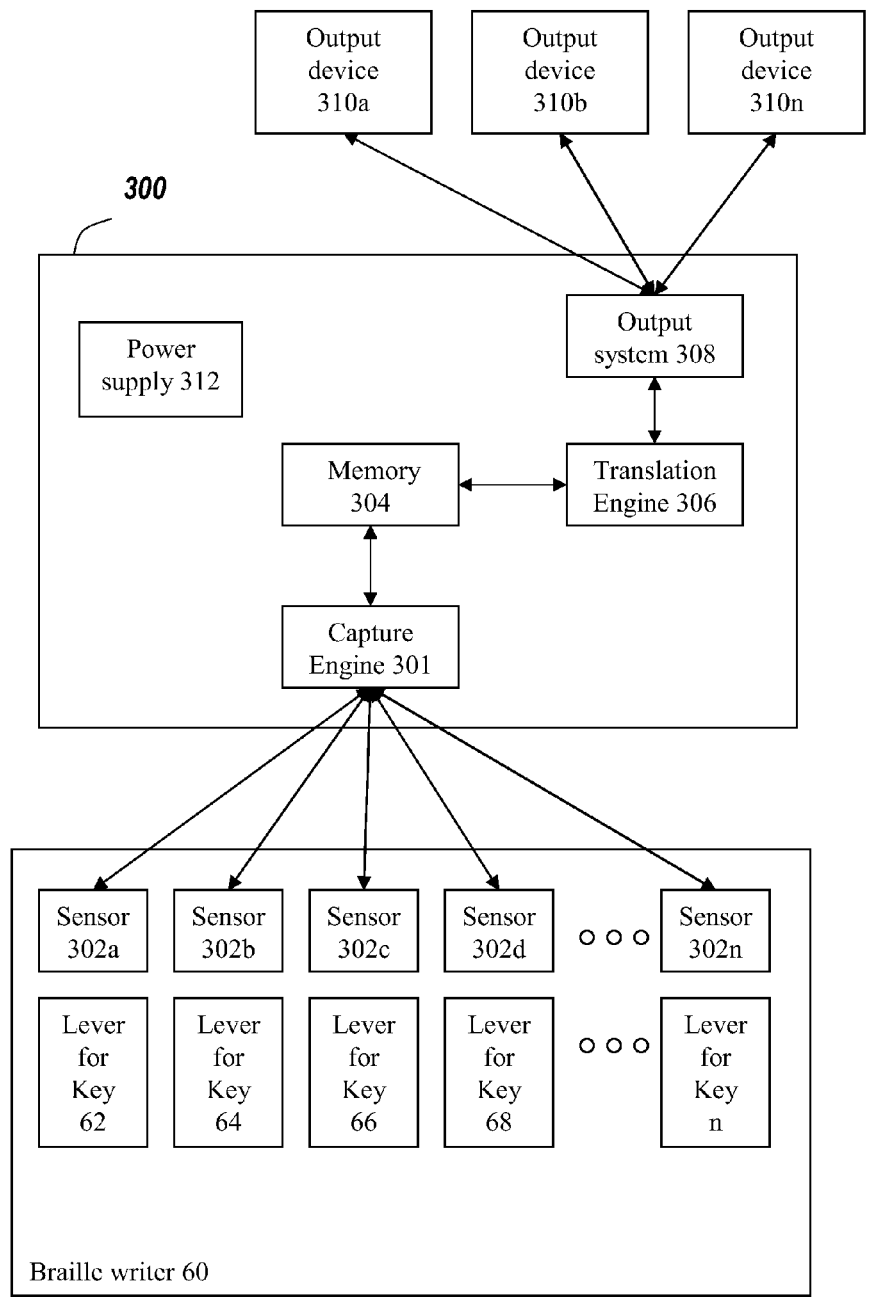
FIG. 3A is a block diagram of an implementation of a system for capturing and translating Braille embossing.

Referring now to FIG. 3A, a block diagram of an implementation of a system 300 for capturing and translating Braille embossing of a mechanical Braille writer is shown and described. The system 300 can include a capture engine 301 coupled to a plurality of sensors 302a-302n (collectively, 302). The sensors can be positioned within a mechanical Braille writer 60 to capture activity of the writer (e.g., depression of a key, reset of a key, movement of a lever connected to a key). Capture engine 301 can connect to a memory unit 304 for storing data corresponding to the activity. A translation engine 306 can interpret the activity. The translation engine 306 can send the results of the interpretation to an output system 308. Output system 308 can send the results to one or more output devices 310a-310n for, e.g., display, audio transmission. In some implementations, the system 300 can include a power supply 312.

In some implementations, a capture engine 301 can be coupled to a plurality of sensors 302 for sensing movement of mechanical parts of a mechanical Braille writer 60. For example, a sensor 302 can be placed proximate to a lever coupled to an embossing key 62-72. In some implementations, a sensor 302 can include a Hall-effect sensor, such as a US 1881 Hall Latch manufactured by Melexis Microelectronic Systems of Ieper, Belgium. A magnet can be attached to a lever. When a user of the writer 60 depresses a key, the lever coupled to the key can move such that the attached magnet approaches and/or passes a Hall plate of the sensor. In some implementations, a magnet can be placed on the underside of a key, on a horizontal bar (e.g., lever), or on a pin lifter of the embosser head. A Hall-effect sensor can be placed such that motion of the key, bar, lever, and/or pin lifter during operation of the Braille writer 60 brings magnet proximate to the sensor. In some implementations, the motion positions the magnet to saturate the Hall-effect sensor. In some implementations, a magnet and sensor can be placed in first orientation for a first key, and in a second orientation for a second key, to provide flexibility in interior placement of components.

In some implementations, a depressed key in a Braille writer 60 can move a roller and cam, thereby drawing a pivoting arm forward. In some implementations, a sensor 302 can be placed proximate to the pivoting arm. A magnet can be mounted on the arm such that motion of the arm moves the magnet past the sensor 302. In some implementations, one or more components of the mechanical Braille writer 60 can be magnetized, thereby eliminating the need for additional magnets.

Although some implementations described herein use Hall-effect sensors, other types of sensors can be used. In some implementations, an optical sensor can be used to detect reflection, transmission, and/or lack of transmission of an optical signal. An optical sensor and an optical source can be positioned within a Braille writer 60 such that movement of a lever during embossing positions the lever between the sensor and source, thereby blocking detection of an optical signal. An optical sensor and an optical source can be positioned such that a lever can reflect the source to the sensor during embossing.

In some implementations, a capacitive switch can be used for the sensor 302. A plate of a capacitor can be installed on a lever and/or key. Movement of the lever and/or key during embossing can change the capacitance of the capacitor, which can be detected. In some implementations, movement of a lever can position the lever between plates of a capacitor, changing its capacitance. In some implementations, a mechanical switch can be used as the sensor. Movement of the key, lever, bar, and/or pin lifter can press and/or release the mechanical switch.

In some implementations, a sensor 302 can be coupled to an embossing key. In some implementations, a sensor 302 can be coupled to a space key. In some implementations, a sensor 302 can be coupled to a backspace key. In some implementations, a sensor 302 can be coupled to a correction key (e.g., a correction pad). In some implementations, a sensor 302 can be coupled to a function key. In some implementations, a sensor 302 can be coupled to a paper roll mechanism. In some implementations, a sensor 302 can be coupled to a position on the paper roll (e.g., a position within a predetermined number of characters from the end of a line). In some implementations, a sensor 302 can be coupled to a carriage key.

In some implementations, capture engine 301 can comprise logic and/or other functionality for detecting signals from one or more sensors 302 and storing the signals in a memory 304. In some implementations, capture engine 301 can determine that a user has depressed a key when a signal from a sensor coupled to the key exceeds a predetermined threshold (e.g., a magnet attached to the key saturates a Hall-effect sensor as the user operates the key). In some implementations, capture engine 301 can determine that a user has depressed a key when a signal from a sensor coupled to the key falls below a predetermined threshold (e.g., a lever coupled to the key obstructs the path between an optical source and an optical sensor as the user operates the key). In some implementations, capture engine 301 can include an analog-to-digital (A/D) converter for converting analog signals to digital signals. The A/D converter can convert signals larger or smaller than the predetermined threshold.

In some implementations, capture engine 301 can determine if a Braille cell has been completed. A Braille cell can be completed when all keys for a cell entry have been depressed and/or released. For example, three simultaneously pressed keys can correspond to three dots in a single cell. In another example, a user can press a first key, second key, and third key. Sensors 302 corresponding to the keys can send signals to the capture engine 301 indicating the keys have been depressed. The capture engine 301 can interpret the signals to determine if the key depressions corresponding to a single cell, two cells, or three cells.

In some implementations, capture engine 301 can detect both key depressions and releases (also referred to herein as "resets"). Capture engine 301 can interpret such depressions and releases to determine that a Braille cell has been completed. In some implementations implementation, capture engine 301 can interpret the release of all keys as the completion of a Braille cell. For example, once the capture engine 301 receives a signal above a predetermined threshold from a sensor, the capture engine 301 can continue receiving signals from the sensors until all the signals fall below the predetermined threshold. The received signals can be considered a complete Braille cell.

In some implementations, capture engine 301 can include a de-bouncing circuit. The de-bouncing circuit can reduce sensitivity and provide hysteresis. The de-bouncing circuit can aid the capture engine 301 in interpreting temporally proximate key depressions as belonging to the same Braille cell. In some implementations, the de-bouncing circuit can interpret key depressions within a predetermined period of time to belong to the same Braille cell. For example, once the capture engine 301 receives a signal above a predetermined threshold from a sensor, the capture engine 301 can interpret all signals received from the sensors within a predetermined period of time as belonging to the same Braille cell. Exemplary periods of time include 10 ms, 20 ms, 50 ms, 100 ms, or 500 ms, although any other period of time can be used.

In some implementations, the de-bouncing circuit can restart the predetermined period of time each time the capture engine 301 receives a signal from a sensor above a predetermined threshold. When the predetermined period of time elapses without further key depressions, the capture engine 301 can interpret received signals as belonging to the same Braille cell. In some implementations, the predetermined period of time can be adjustable, according to the user's typing and/or embossing speed.

In some implementations, the capture engine 301 can interpret signals as belonging to the same Braille cell based on movement of the space key and/or embosser head. Capture engine 301 can be coupled to a sensor 302 that detects movement of the space key and/or embosser head. Capture engine 301 can interpret movement of the space key and/or embosser head as completion of a Braille cell. Capture engine 301 can interpret signals received between movements of the space key and/or embosser head as belonging to the same Braille cell. These implementations can contemplate Braille writers with embosser keys mechanically linked to the space key (e.g., depressing an embosser key can simultaneously depress the space key; releasing the embosser key can simultaneously release the space key, thereby advancing the embosser; depressing the space key and/or embossing key advances the embosser head).

In some implementations, translation engine 306 can comprise logic or other functionality for interpreting one or more signals as a character (e.g., ASCII character). The translation engine 306 can interpret the signals to obtain a Braille cell and/or a value of a Braille cell.

Translation engine 306 can include a dictionary. The dictionary can include Braille cells and their corresponding alphanumeric characters, words, punctuation, and/or contractions, by way of example. In some implementations, translation engine 306 can include dictionaries for different languages. In some implementations, translation engine 306 can include dictionaries for different systems, such as grade 1 Braille and/or grade 2 Braille. Translation engine 306 can receive inputs from a user (e.g., sequence of key presses as a command sequence) for selecting a dictionary and/or switching between dictionaries.

In some implementations, a dictionary of translation engine 306 can include an index table. Indices can correspond to Braille cells and/or values of Braille cells. The entries for the Braille cells can be corresponding alphanumeric characters, punctuation, words, and/or contractions, by way of example. In some implementations, translation engine 306 can include a memory. The memory can store values (e.g., ASCII characters, ASCII strings) at addresses corresponding to values of Braille cells. For example, an empty cell can be addressed as address 0, while a full six-dot cell can be addressed as address 31. Thus, translation engine 306 can include a lookup table. In some implementations, a sensor 302 can be mounted to a key representing a function key. If the user is operating the function key, translation engine 306 can use a second lookup table instead of a first lookup table. For example, when the user is not operating the function key, translation engine 306 can access a first lookup table and retrieve an entry corresponding to a depressed key (e.g., the letter "a"). When the user operates the function key, translation engine 306 can access a second lookup table instead of the first lookup table. The entry in the second lookup table corresponding to the depressed key can include, for example, a command to read out a line of text, instead of registering the letter "a."

Memory 304 can include a memory (e.g., cache) for transferring signals from capture engine 301 to translation engine 306. In some implementations, capture engine 301 and translation engine 306 can be connected via a bus. In some implementations, the translation engine 306 and capture engine 301 can be implemented via a single engine and/or processor. Memory 304 can include an internal cache or memory element of a single engine. In some implementations, memory 304 can include sufficient memory to retain sequences of characters, such as words, lines, sentences, paragraphs, and/or pages.

In response to a command (e.g., operation of a function key and a predetermined set of embossing keys), output system 308 can access the sequences from memory 304. For example, an output system 308 can obtain sequences from memory 304 until the last recorded punctuation mark. The output system 308 can apply a text-to-speech function to the sequences. The system 308 can output the resulting sequences to an output device 310, such as a speaker. Thus, a user can operate the system 300 to recite the most recently embossed sentence. In some implementations, the output system 308 includes a text-to-speech function that can support multiple languages (e.g., English, Russian, Spanish, French, German, Portuguese, Arabic, Hindi).

In some implementations, the capture engine 301 can receive a signal from a sensor indicating the paper roll has reached a predetermined position. The capture engine 301 can send the signal to the translation engine 306. The translation engine 306 can generate a near-end-of-line alert, based on the signal. The translation engine 306 can send an instruction to the output system 308 to output a near-end-of-line alert. In some implementations, the alert can be an audio signal stating that the writer 60 is within a predetermined number of characters from the end of the line. Other types of audio signals may be used, such as clicks and/or beeps.

Output system 308 can comprise logic and/or functionality for outputting alphanumeric characters, words, punctuation, and/or other symbols to one or more output devices 310a-310n. An exemplary output device 310 can include a liquid crystal display (LCD), and output system 308 can send signals corresponding to characters for display on the LCD. Thus, a partially sighted user can use a large-character LCD when learning to type Braille. A sighted teacher can observe the LCD to correct a student's typing. In some implementations, the LCD screen can display system information in addition to text corresponding to user typing (e.g., remaining battery life, remaining memory capacity, current language). In some implementations, the LCD screen can include an interface for connecting to an external VGA monitor. In some implementations, the LCD screen can include an interface for outputting micro-HDMI digital video and/or audio signals to an external device.

Another exemplary output device 310 can include a speaker, when output system 308 includes a text-to-speech function. Output device 310 can thus recite embossed sequences. In some implementations, output system 308 can generate sounds for punctuation (e.g., non-verbal sounds). In some implementations, output system 308 can generate a click for a space, a first tone for a period, and/or a second tone for a question mark. Output system 308 can generate beeps, chords, notes, and/or other sounds to notify a user of an entered character.

Another exemplary output device 310 can include a storage device. As the translation engine 206 translates signals into, e.g., alphanumeric characters, the output system 308 can store the characters on a storage device. Thus, users can later retrieve text produced via the Braille writer 60 from a file on the storage device.

In some implementations, output device 310 can include a printer, cathode ray tube (CRT) monitor, storage device, teletypewriter, and/or any other device capable of converting a signal to a perceivable output. In some implementations, an output device 310 can be paired to an input of a computing device. For example, an output device 310 can include a network interface, such as an Ethernet connection to a network. Output system 308 can comprise functionality for sending data via the network to another computing device, such as a terminal client, an ftp or http client, an http, ftp, ssh server, or any other client or server interface. In some implementations, an output device 310 can include a serial or parallel connection to another external device, including a USB connection.

In some implementations, system 300 can include a power supply 312. A power supply 312 can comprise one or more power storage devices, such as a battery, flywheel, capacitor, fuel cell, or other structure for storing electrical power. In some implementations, a power supply 312 can include a power generation device, such as a solar cell, or a mainspring and crank. In some implementations, power supply 312 can convert an external AC or DC voltage to one or more DC voltages usable by system 300 and sensors 302, including a transformer, a voltage regulator circuit, or other similar structures. In some implementations, a power supply 312 can comprise a combination of these elements, such as a combination of rechargeable batteries and solar cells, or AC to DC conversion and batteries. In some implementations, power supply 312 can include a standard power connector such that a user can connect an external power supply to the system 300. For example, a power supply 312 can include a USB receptacle such that a user can connect a USB plug to draw from a computer power supply or battery device. In another example, power supply 312 can include a receptacle for connecting an external cranked electrical generator or solar power device. In some implementations, power supply 312 can include a power switch and/or a power level indicator. In a further implementation, power supply 312 can include functionality for generating, via output system 308, sounds, graphics, or other data to indicate to a user conditions such as power-on, low power, battery-charging, or any other available information regarding power conditions.

In some implementations, system 300 can be an add-on module for a Braille writer 60. Such an add-on module can be installed on a mechanical Braille writer and sold with the writer. In some implementations, the add-on module can be sold individually, and a user may install the module on a Braille writer 60. Sensors 302a-n can be mounted on a sensor board designed to be installed within a mechanical Braille writer 60 as a single unit. In some implementations, the sensors 302 can be conformally coated and/or enclosed. In some implementations, system 300 can be integrated into a Braille writer 60.

Figure 3B:
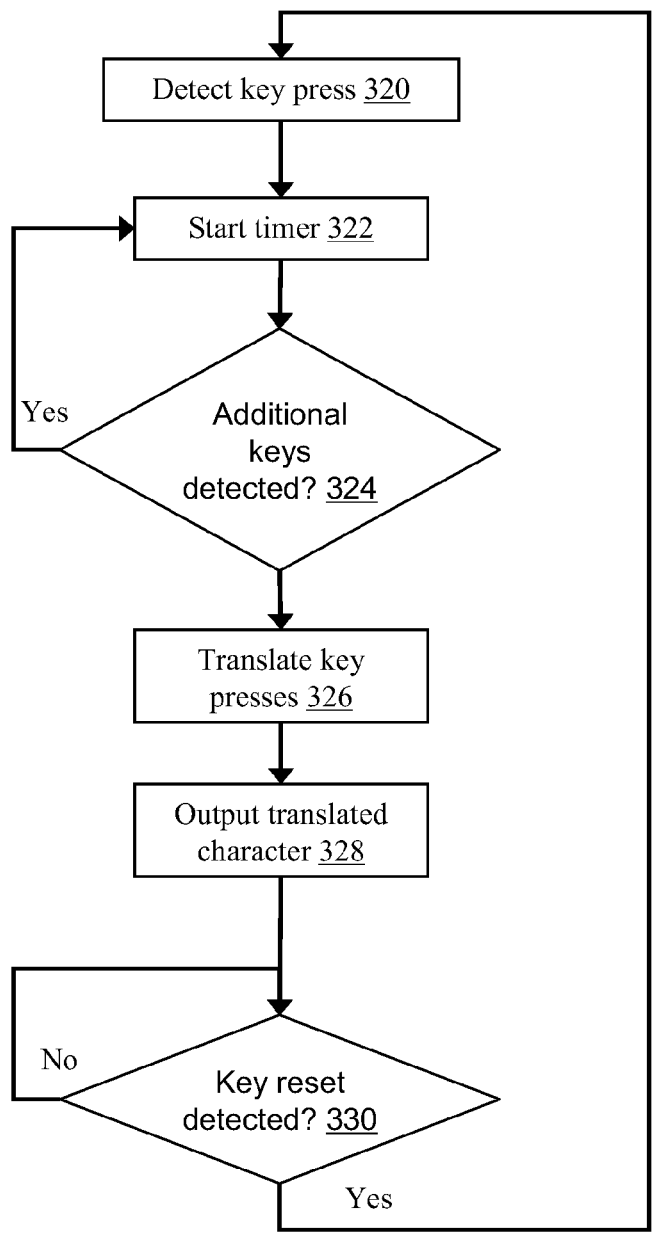
FIG. 3B is a flow chart of an implementation of a method for capturing and translating Braille embossing.

Referring now to FIG. 3B, a flow chart of an exemplary method for capturing and translating embossing of a mechanical Braille writer is shown and described. In general overview, a capture engine 301 can detect a key press (step 320). The capture engine can start a timer (step 322). In response to detection of further key presses, the capture engine can restart the timer (step 324). The capture engine can continue restarting the timer whenever the engine detects another key press (steps 322-324). When the timer expires, the translation engine can deem the signals captured by the timer as a Braille cell. The translation engine can translate the signals for the Braille cell (step 326). An output system 308 can output the translated signals to output devices (step 328). The capture engine can detect the reset and/or release of all the keys (step 330). The capture engine can wait for the next key press (step 320).

The method can include a capture engine 301 detecting a key press (step 320). One or more sensors 302 can send a signal to the capture engine 301 according to movement of a component coupled to an embossing key and/or space bar. If the signal meets conditions (e.g., exceeds or falls below a predetermined threshold), capture engine 301 can interpret the signal as depression of a key. In some implementations, the sensors 302 can create an analog and/or digital signal corresponding to the motion. In some implementations, the capture engine 301 can de-bounce the signal to reduce sensitivity or avoid errors.

The method can include a capture engine starting a timer (step 322). In some implementations, the timer can aid hysteresis such that the capture engine interprets keys pressed nearly simultaneously as belonging to the same Braille cell. In some implementations, if additional key presses are detected before the timer expires, the capture engine can reset the timer (step 324). In some implementations, the capture engine does not reset the timer in response to additional key presses. In some implementations, when the timer expires, the capture engine sends signals captured from the sensors 302 to the translation engine.

The method can include a translation engine translating captured key presses (step 326). The translation engine can translate captured key presses according to a Braille dictionary, lookup table, and/or other index. The translation engine can translate key presses into a letter, number, symbol, prefix or suffix, combination of letters, word, punctuation mark, or other character or characters, as discussed above.

The method can include an output system 308 outputting the translated signals to output devices (step 328). An output system 308 can output the translated captured key presses via a visual display, such as an LCD or CRT. An output system can output the translated captured key presses via an audio system, such as a text-to-speech engine, amplifier, and/or speaker. An output system can output the translated captured key presses as data to another computing device, such as a printer, a storage device, or another computer via a network.

The method can include a capture engine detecting the reset and/or release of all the keys (step 330). The capture engine can detect that signals received by the sensors have exceeded a predetermined threshold. The capture engine can detect that signals received by sensors have fallen below a predetermined threshold. In some implementations, the embosser head of a Braille writer cannot move until all keys have been released. Thus, the system 300 can account for unexpected behavior, such as a user holding one key down while repeatedly pressing another key. Upon detecting reset of all keys, the method can repeat steps 320-330.

Figure 4:
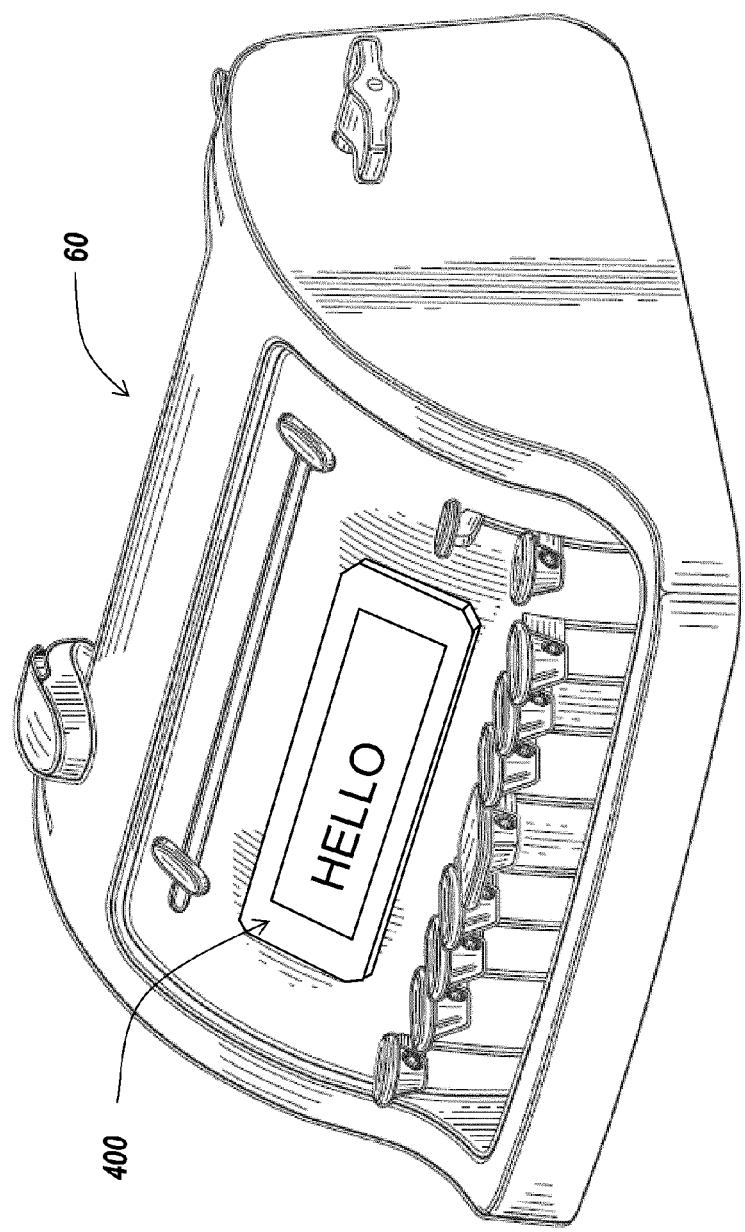
FIG. 4 is a block diagram of an implementation of an installed add-on output module for a mechanical Braille writer.

Referring now to FIG. 4, a block diagram of an exemplary mechanical Braille writer 60 with an installed capture and translation module (not visible) and installed LCD screen 400 is shown and described. Although referred to as an LCD screen, in many implementations, screen 400 can include an Organic Light Emitting Diode (OLED) based display, an electronic ink (eInk) display, or any other type and form of visual display module. Although shown installed to the mechanical Braille writer 60, in many implementations, LCD screen 400 can be a separate unit connected via an interconnection cable to a capture and translation module. In some implementations, an LCD screen 400 can comprise a speaker or speakers for a text-to-speech engine to output translated characters, as discussed above.

In some implementations, LCD screen 400 can be attached to a front surface of a mechanical Braille writer 60. For example, LCD screen 400 can be attached via an adhesive substance. LCD screen 400 can be attached mechanically via screws, bolts, snaps, toggles, pins, or other type and form of mechanical attachment. LCD screen 400 can be attached via a magnetic attachment. LCD screen 400 can comprise one or more magnets or magnetic sections, and the front surface of mechanical Braille writer 60 can comprise a ferrous material. LCD screen 400 can be removable. LCD screen 400 can comprise a connector, such as an edge connector, ribbon connector, USB connector, parallel or serial connector, or other interconnection for providing one or more data signals to LCD screen 400. LCD screen 400 can be non-removable and can be mounted to Braille writer 60. The front panel of Braille writer 60 can comprise a cavity or opening sized to receive LCD screen 400, which can thus be mounted within Braille writer 60. LCD screen 400 can be mounted to protrude from Braille writer 60, as illustrated in FIG. 4. In some implementations, LCD screen 400 can be mounted flush with the front panel of Braille writer 60.

In some implementations, LCD screen 400 can include a dimmable backlight. In some implementations, LCD screen 400 can be disabled.

Figure 5:
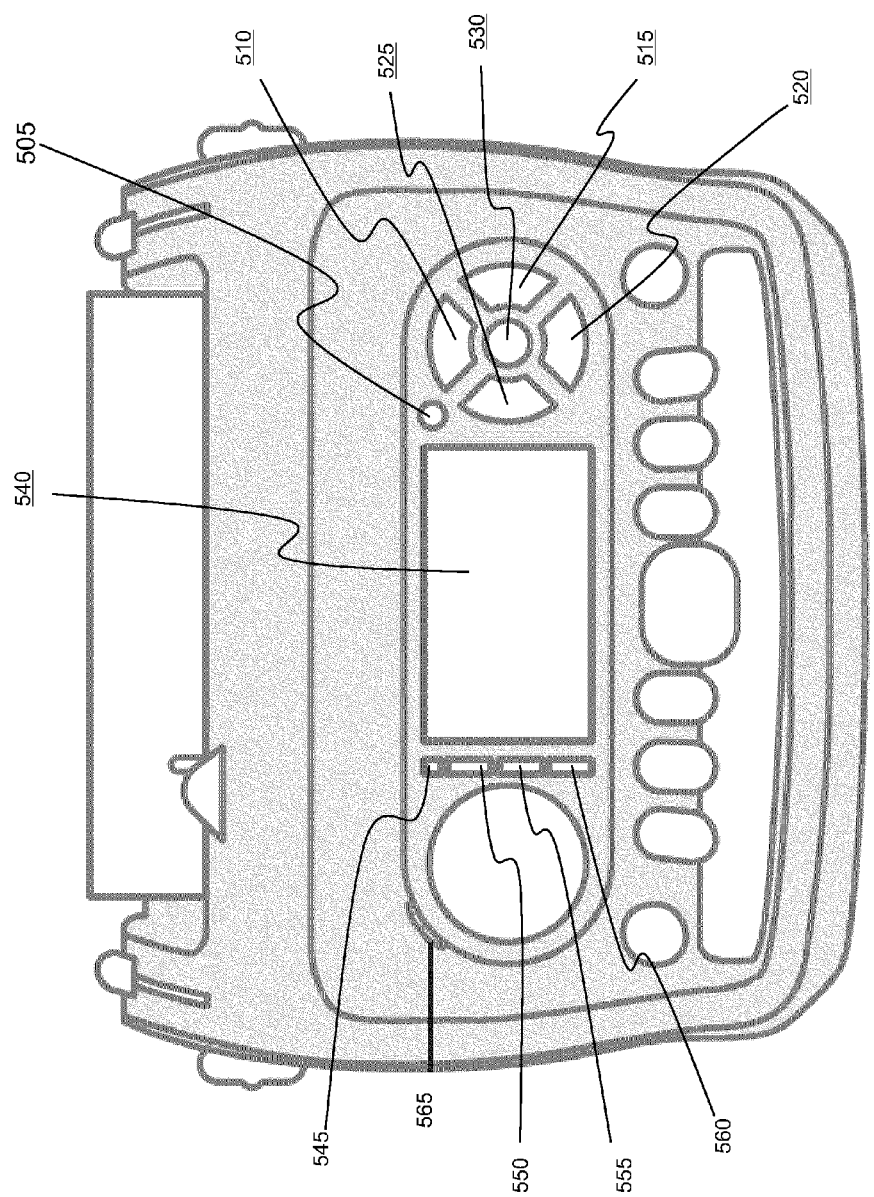
FIG. 5 is a diagram of a Braille writer showing the interface for a system for capturing and translating Braille embossing.

Referring now to FIG. 5, a diagram of a Braille writer showing the interface for a system for capturing and translating Braille embossing is shown and described. The interface can include a control, such as a button 505, for entering or exiting a menu. The menu can be displayed on a screen 540. A user can navigate through the options on the menu via directional controls 510, 515, 520, and 535. The user can select an option on the menu via a selection control 530. In some implementations, the menu includes options for selecting a braille grade. In some implementations, the menu includes options for selecting a language. In some implementations, the menu includes options for selecting settings of a text-to-speech function (e.g., the speed at which the text-to-speech function will read out text). The user can operate the directional controls 510 and 520 to increase or decrease the speed of read-out. The user can operate the selection control 530 to select a setting for the speed.

In some implementations, the menu can include options for recalling user settings (e.g., language, size of text for LCD screen, text-to-speech settings). The menu can include options for setting power management. For example, a user can set an auto-off and/or sleep mode. The Braille writer 60 and/or system 300 can enter a reduced power consumption state after a predetermined period of time of inactivity (e.g., 5, 10, 15, or 30 minutes). The menu can include options for retrieving files of previously entered text. Operation of such controls can display a list of files saved on an internal memory of the writer 60 and/or on an external storage device connected to the writer 60 (e.g., a USB drive). In some implementations, operation of the controls sends audio signals corresponding to the names of files to a speaker. By operating a control, a user can temporarily select a file and the beginning lines of the file can be output to the speaker. The user can then select the file for editing.

The menu can include options for controlling an output device 310, such as an LCD screen. In some implementations, the menu can include an option for dimming a backlight of the LCD screen.

In some implementations, the menu includes options for selecting a brailling screen setup. For example, the menu can enable a user to change the size of text displayed on the screen 540. In some implementations, the menu includes options for selecting a color setting for the screen. For example, the menu can enable a user to change the screen to operate in a black and white mode or a color mode.

The interface can include a control 545 for turning the screen 540 on or off. The interface can include a control 550 for setting a condition for text-to-speech functions, a control 555 for selecting a brailling screen setup, and/or a control 560 for selecting a color setting for the screen. Iteratively selecting any of the controls can enable the system 300 to cycle through common settings for the function. The user can stop selecting the control 550 when the system 300 arrives at the user's desired setting.

The interface can include a control 565 that controls the volume an output device 310, such as a speaker. In some implementations, the interface can include a audio headphone jack (not shown).

Having described certain implementations of methods and systems for capturing and translating Braille embossing, it will now become apparent to one of skill in the art that other implementations incorporating the concepts of the disclosure can be used.

What is claimed is:

1. A Braille writer, comprising:
a chassis supporting at least one finger operated key, each key of the at least one finger operated keys coupled to an embossing mechanism so that depression of a key causes a corresponding one of at least one pin in the embossing mechanism to extend outwardly from the embossing mechanism to create a raised dot on paper adjacent to the embossing mechanism, the coupling of the finger operated keys and embossing mechanism consisting of one or more mechanical interconnections and not including an electrical connection; and
a capture module having a powered state and an unpowered state and comprising: (i) at least one sensor for sensing movement of the corresponding mechanical interconnection of the at least one finger operated key and at least one pin, and (ii) a memory element for storing an output of each of the at least one sensors;
such that, when the capture module is in the unpowered state, depression of a key causes the corresponding one of at least one pin in the embossing mechanism to extend outwardly from the embossing mechanism to create the raised dot on paper adjacent to the embossing mechanism.

2. The Braille writer of claim 1, wherein the at least one sensor comprises at least one optical sensor, and wherein the capture module further comprises a corresponding at least one optical source.

3. The Braille writer of claim 1, wherein the at least one sensor comprises at least one magnetic sensor, and wherein the capture module further comprises a corresponding at least one magnet attached to a corresponding at least one finger operated key or mechanical interconnection of the at least one finger operated key and at least one pin.

4. The Braille writer of claim 1, wherein the at least one sensor comprises at least one mechanical switch.

5. The Braille writer of claim 1, wherein the at least one sensor comprises at least one capacitive switch.

6. The Braille writer of claim 1, wherein the capture module further comprises a de-bouncing circuit.

7. The Braille writer of claim 1, wherein the capture module further comprises a Braille translation engine for translating at least one signal from the corresponding at least one sensor corresponding to one or more embossed dots of a Braille cell into one or more alphanumeric characters or text symbols.

8. The Braille writer of claim 7, wherein the Braille translation engine is configured to interpret a first output signal of a first sensor of the at least one sensor as initiating embossing of a Braille cell, and a second output signal of the first sensor of the at least one sensor as completing embossing of the Braille cell.

9. The Braille writer of claim 7, wherein the Braille translation engine is configured to interpret an output signal of a first sensor of a plurality of sensors as corresponding to at least one dot of an embossed Braille cell, and an output signal of a second sensor of a plurality of sensors as completing embossing of the Braille cell.

10. The Braille writer of claim 7, wherein the capture module further comprises a timer with a predetermined expiration time started upon receipt of a signal from the at least one sensor, and the Braille translation engine is configured to interpret all further signals received from the at least one sensor until expiration of the timer as corresponding to a single Braille cell.

* * * * *